(12) United States Patent
Westra et al.

(10) Patent No.: US 8,292,220 B1
(45) Date of Patent: Oct. 23, 2012

(54) FLYING WING AIRCRAFT WITH MODULAR MISSIONIZED ELEMENTS

(75) Inventors: Bryan Wayne Westra, LaPalma, CA (US); Roxanne Marie Sato, Rancho Palos Verdes, CA (US); Douglas Ellwood Shultz, La Habra, CA (US); James Franklin Kerswell, Los Angeles, CA (US); Perry Bruce Petersen, Pinehurst, NC (US); Scott Walter Collins, Upland, CA (US)

(73) Assignee: Northrop Grumman Corporation, Falls Church, VA (US)

( * ) Notice: Subject to any disclaimer, the term of this patent is extended or adjusted under 35 U.S.C. 154(b) by 537 days.

(21) Appl. No.: 12/383,193

(22) Filed: Mar. 19, 2009

(51) Int. Cl.
*B64C 1/22* (2006.01)
(52) U.S. Cl. .................. 244/118.1; 244/137.1
(58) Field of Classification Search ............... 244/2, 36, 244/118.1, 118.2, 120, 129.1, 137.1, 45 A, 244/207
See application file for complete search history.

(56) References Cited

U.S. PATENT DOCUMENTS

| | | | | |
|---|---|---|---|---|
| 3,062,483 A * | 11/1962 | Davidson | 244/207 |
| 3,066,894 A * | 12/1962 | Davidson | 244/76 R |
| 3,188,022 A * | 6/1965 | Ornberg | 244/45 A |
| 3,471,107 A * | 10/1969 | Ornberg | 244/199.1 |
| 3,774,864 A * | 11/1973 | Hurkamp | 244/13 |
| 4,426,050 A * | 1/1984 | Long | 244/135 R |
| 4,641,800 A * | 2/1987 | Rutan | 244/218 |
| 4,736,910 A * | 4/1988 | O'Quinn et al. | 244/120 |
| 4,767,083 A * | 8/1988 | Koenig et al. | 244/12.3 |
| 5,082,204 A * | 1/1992 | Croston | 244/126 |
| 5,255,881 A * | 10/1993 | Rao | 244/199.1 |
| 5,398,888 A * | 3/1995 | Gerhardt | 244/45 A |
| 5,495,999 A * | 3/1996 | Cymara | 244/45 A |
| 5,975,464 A | 11/1999 | Rutan | 244/120 |
| 5,992,792 A * | 11/1999 | Arnason | 244/13 |
| 6,554,227 B2 * | 4/2003 | Wolter | 244/140 |
| 6,568,632 B2 * | 5/2003 | Page et al. | 244/36 |
| 6,578,798 B1 * | 6/2003 | Dizdarevic et al. | 244/199.1 |
| 6,708,924 B2 * | 3/2004 | Page et al. | 244/36 |
| 6,926,235 B2 * | 8/2005 | Ouellette et al. | 244/120 |
| 6,929,216 B2 * | 8/2005 | Bath et al. | 244/45 A |
| 7,093,798 B2 * | 8/2006 | Whelan et al. | 244/120 |
| 7,308,762 B2 * | 12/2007 | Bath et al. | 29/898.01 |
| D588,519 S * | 3/2009 | Westra et al. | D12/319 |
| D588,976 S * | 3/2009 | Westra et al. | D12/319 |
| 2002/0043587 A1 * | 4/2002 | Wolter | 244/4 R |
| 2003/0192986 A1 * | 10/2003 | Page et al. | 244/36 |

* cited by examiner

*Primary Examiner* — Benjamin P Lee
(74) *Attorney, Agent, or Firm* — Stetina Brunda Garred & Brucker

(57) ABSTRACT

The invention is a flying wing aircraft having a forward fuselage; an aft fuselage segment; a propulsion segments adapted to mate to the fuselage segments; a pair of wing segments adapted to mate with the propulsion segments. The invention further includes a center section adapted to fit between the forward and aft fuselage sections; the center section adapted to receive multiple compartment systems.

11 Claims, 7 Drawing Sheets

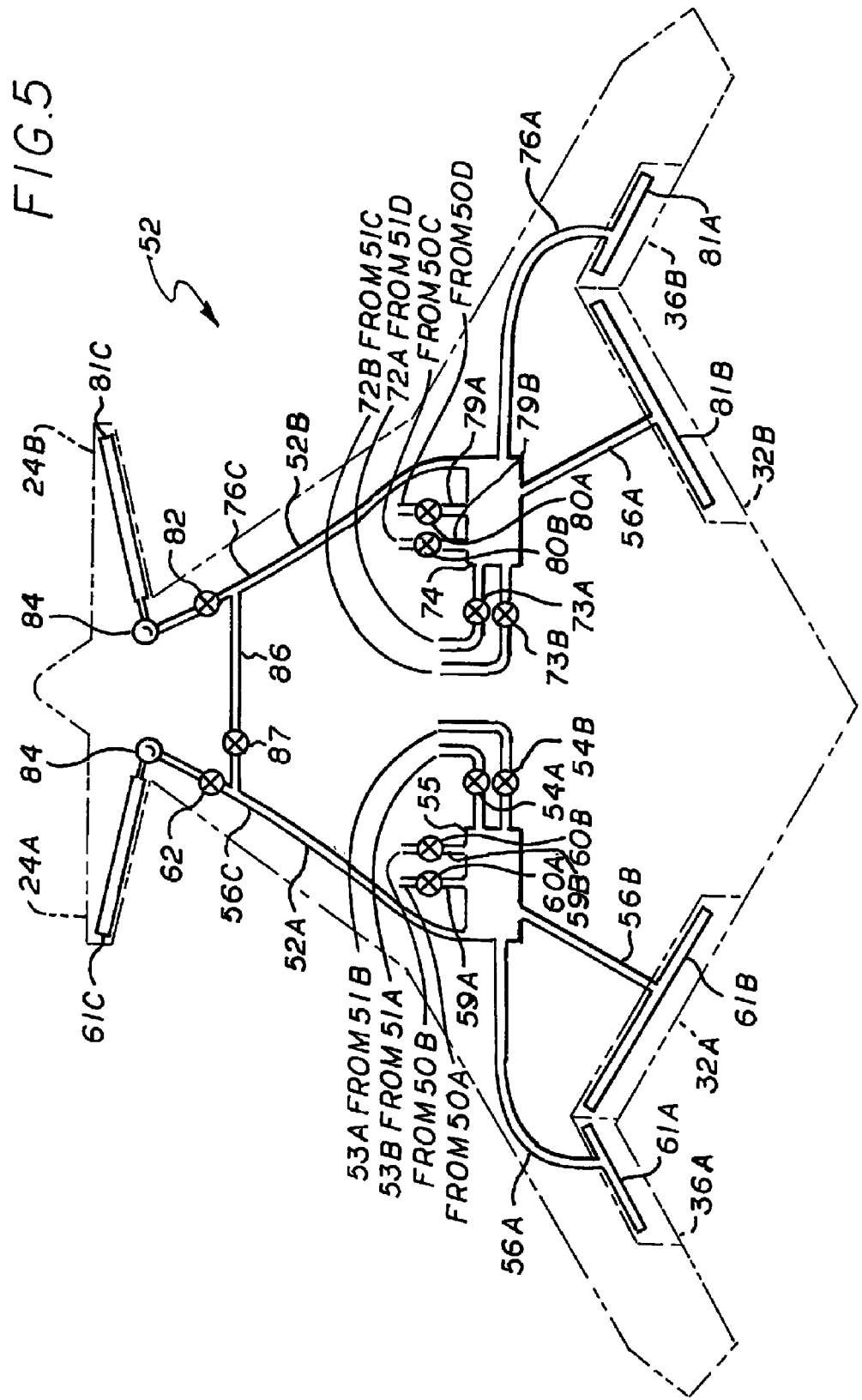

FLYING WING AIRCRAFT WITH MODULAR MISSIONIZED ELEMENTS

BACKGROUND OF THE INVENTION

1. Field of the Invention

The invention relates to the field of aircraft manufacturing and, in particular, to a modular design for an aircraft providing an increase in structural commonality while retaining high performance in a single aircraft to architecture designed for multiple missions.

2. Description of Related Art

The typical aircraft is designed for a few, relatively common mission, for example, a passenger airliner can be converted into a cargo aircraft by removing the passenger seats and increasing the size of the doors. In fact, they can be converted into military refueling aircraft, but with notable structural changes. Of course different weapons systems can be loaded on the wings of military aircraft. Military bombers can have their bomb bays constructed to convert to multiple different weapons carriage systems (e.g. rotary launcher assemblies or bomb rack assemblies). However, none of these aircraft are designed to accomplish multiple missions through being configured in the production line for traditionally different missions. Flying wing type aircraft are generally characterized as having an integrated central portion (fuselage in conventional aircraft) and wings wherein both produce lift. The aerodynamic efficiency of flying wing aircraft is well established.

U.S. Pat. No. 5,975,464 Aircraft With Removable Structural Payload Module by E. Rutan discloses an aircraft design wherein a center portion of the fuselage containing the payload is removable and a larger section can be installed. The aircraft also has provisions for adding wing tip extensions to provide additional lift. However, this concept is not particularly new. Commercial airliners are manufactured such that fuselage sections can be added to increase the number of passengers that can be carried. Typically, this requires larger engines and or an increase in wing length.

Furthermore, none of these concepts disclose an aircraft design that is modular and primarily only modifies a portion of the fuselage which carries the payload. In particular, an aircraft design that allows an aircraft to be made into a transport, bomber, or refueling aircraft while maintaining the same external dimensions of the aircraft, and with little effect on overall performance thereof.

Thus, it is a primary object of the invention to provide a highly common airframe with modular elements for mobility (including short take-off and landing airlift or in-flight refueling) and attack missions that minimize construction changes within the major structural components It is a further object of the invention to provide a modular designed flying wing type aircraft.

SUMMARY OF THE INVENTION

The invention is an aircraft that includes a flying wing having a longitudinal axis, vertical axis, and a horizontal axis. The aircraft, as part of the flying wing includes a protruding nose section. A canard is mounted on the nose section. The aircraft's canard, being generally only needed when taking off and landing, is retractable. The aircraft also includes a plurality of extendable flaps mounted on the trailing edge of the flying wing.

The overall design of the flying wing aircraft allows for modular construction. Thus the aircraft includes a forward fuselage; an aft fuselage segment; propulsion segments adapted to mate to the fuselage segments; a pair of wing segments adapted to mate with the propulsion segments. The invention further includes a center section adapted to fit in the aft fuselage section; the center section adapted to receive multiple compartment systems. Typically, the aircraft's multiple cargo compartment systems include a bomb bay and cargo carrying compartment systems.

When the flying wing receives the cargo compartment system, left and right retractable canards are mounted to the forward fuselage section and an air supply system to provide pressurized air from the propulsion system for blowing pressurized air over the canards as well as flaps on the trailing edge of the wing is installed.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 5 is a schematic view of the of the system for blowing air over the flaps and canard of the aircraft shown in FIG. 1

DESCRIPTION OF THE PREFERRED EMBODIMENT

Figure 1:
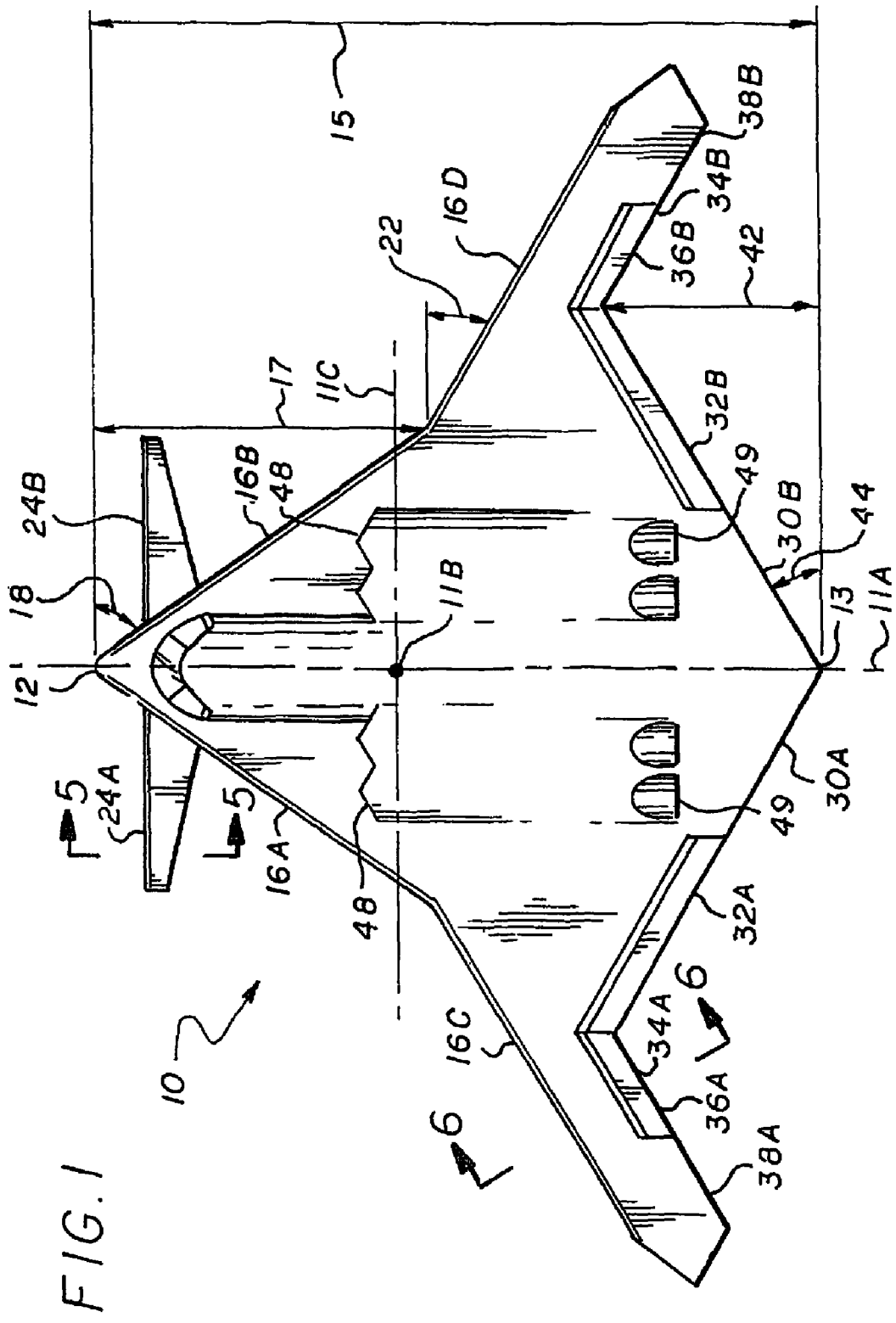
FIG. 1 is a planform view of a flying wing type aircraft partially broken away to show the interior thereof.
Figure 2:
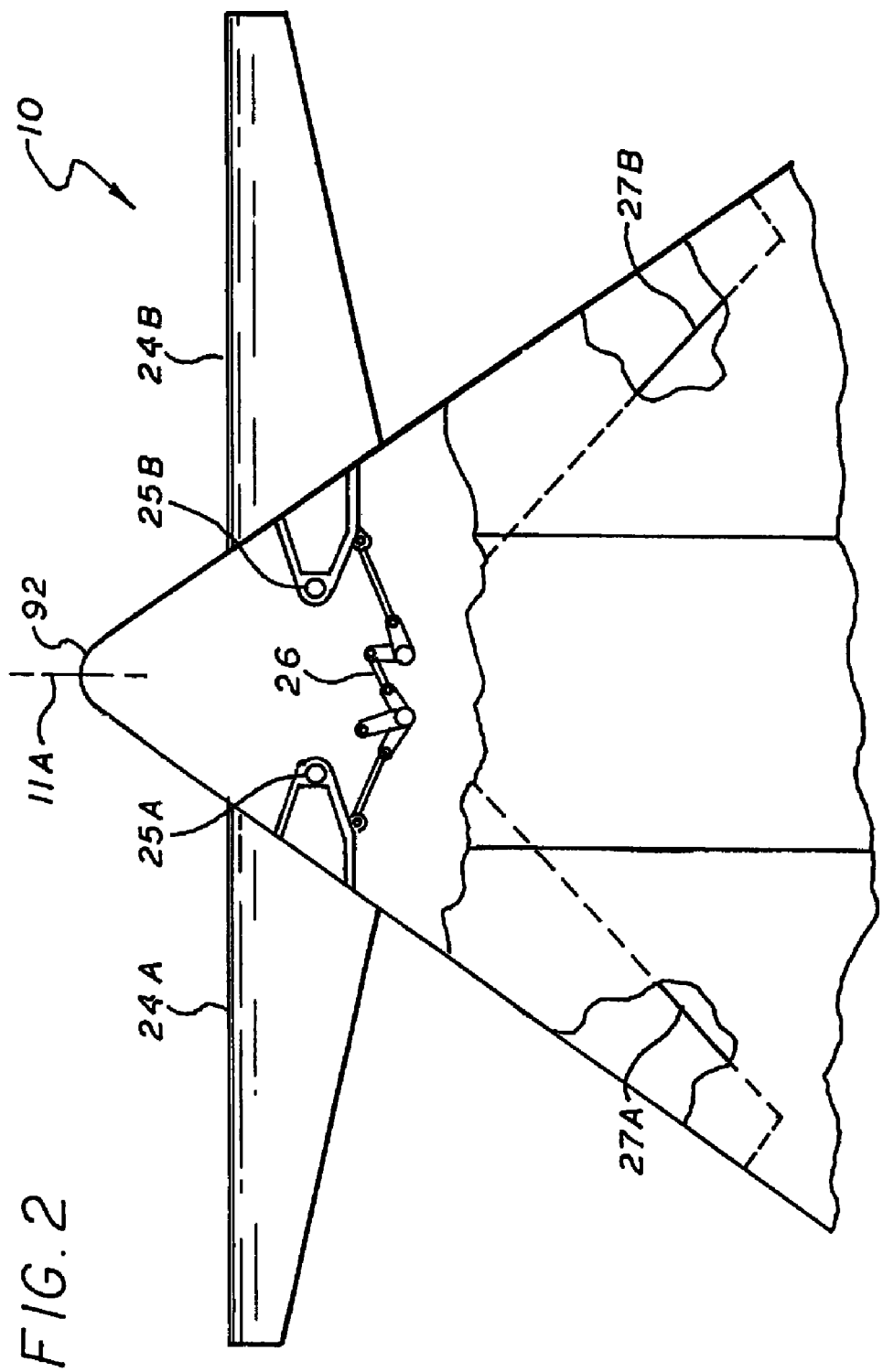
FIG. 2 is a partial cross-sectional view of FIG. 1. illustrating the canard actuation system.
Figure 3:
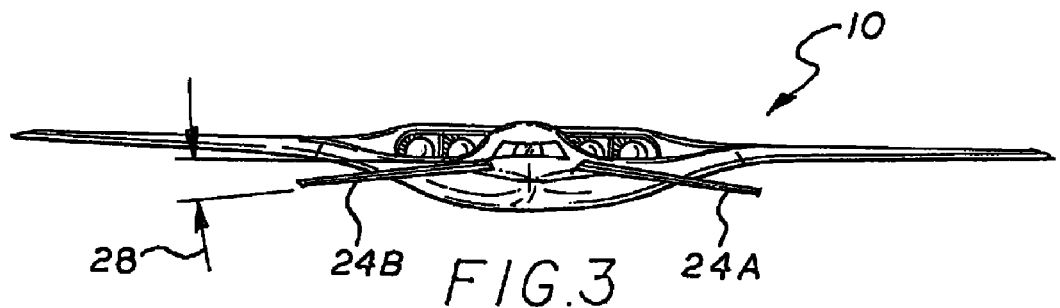
FIG. 3 is a front view of the aircraft shown in FIG. 1
Figure 4:
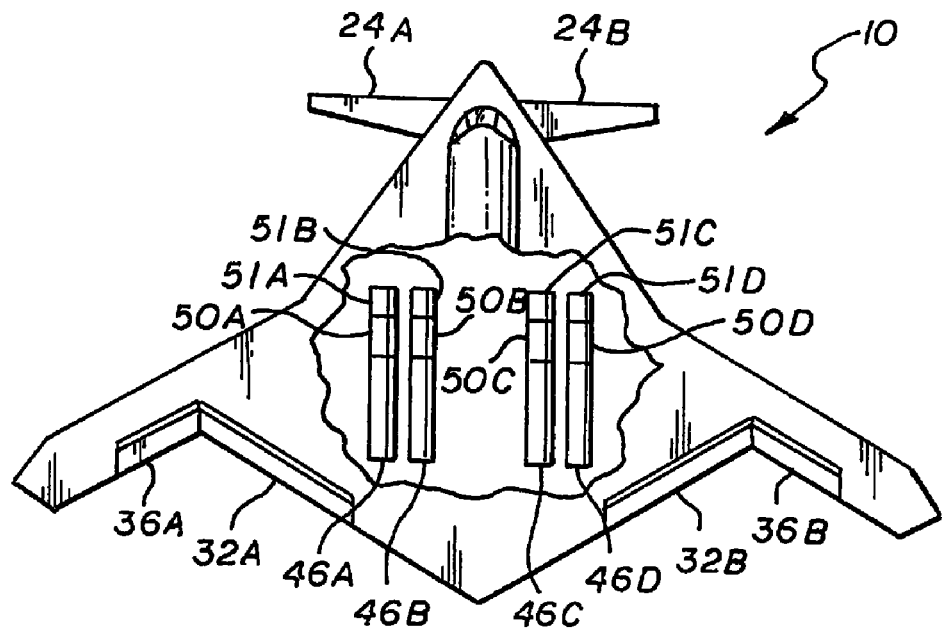
FIG. 4 is a view of the aircraft shown in FIG. 1 partially broken away to show the engines.

Referring to FIGS. 1-5, the flying wing aircraft, is generally designated by numeral 10 and has longitudinal axis 11A, vertical axis 11B and a horizontal axis 11C. The aircraft 10 includes a nose end 12, tail end 13 with an overall length 15. The right and left inner leading edges 16A and 16B extend back from the nose end 12 over a distance 17 at a sweep angle 18, of between 30 and 80 degrees. The distance 17 is about 40 to 60 percent of the total length 15 of the aircraft. The left and right outer leading edges 16C and 16D A have a sweep angle 22, of between 0 and 80 degrees as measured from a local horizontal.

Mounted in proximity to the left and right inner leading edges 16A and 16B are right and left canards 24A and 24B having Coanda effect airfoil cross-sections (see FIG. 5). The canards 24A and 24B have an axis of rotation 25A and 25B, respectively and an actuation system 26 that retract the canards to form part of the leading edge 16A and 16B or the canards may be retracted onto the wing surface. The actuation system 26 will be subsequently discussed. The canards 24A and 24B have a downward angle 28A or upward angle 28B of between 0 and 20 degrees (see FIG. 3).

The left and right inner trailing edges 30A and 30B include inboard trailing edge flaps 32A and 32B, while the outer left and right outer trailing edges 34A and 34B include outboard trailing edge flaps 36A and 36B. External of the outboard flaps 36A and 36B are split rudders 38A and 38B. Referring particularly to FIG. 5, the outer left flap 36A has a pivot axis 39 and actuator(s) 40. All the flaps are similar.

Again referring to FIGS. 1-7, the left and right inner trailing edges 30A and 30B extends forward from the tail end 13 over a distance 42, which is between 15 and 40 percent of the length 15, at a forward sweep angle 44 of between 0 and 45. The left and right outer trailing edge portions 34A and 34B are generally parallel to the left and right outer leading edges 30A and 30B, respectively.

Mounted within the flying wing are four turbofan engines 46A, 46B 46C and 46D. However, while four engines are shown, the aircraft could only have other propulsion systems and corresponding quantities. The four engines 46A-46D have inlet ducts 48 and exhaust ducts 49 all on the top surface of the aircraft. The engines 46A-46B have compressor sections 50A, 50B, 50C and 50D and fan sections 51A, 51B, 51C and 51D.

A pressurized air distribution system, indicated by numeral 52, is installed in the aircraft 10. The distribution system 52 is divided into two halves 52A and 52B. Distribution system 52A includes lines 53A and 53B coupled to the fan sections 50A and 50B of the engines 46A and 46B which included pressure regulator shut off valves 54A and 54B mounted therein. The lines 53A and 53B connect to a distribution duct 55, which provides high pressure air to ducts 56A and 56B and 56C.

At takeoff, the engines are at full power and there is sufficient air at high enough pressure level that only fan air is necessary. However, upon landing, where the engines are at a reduced power setting, additional air from the compressor sections of the engine is provided to maintain pressure levels. Thus coupled to the distribution duct 55 are lines 59A and 59B, having control pressure regulator valves 60A and 60B mounted therein, which are connected to the compressor section 51A and 51A of the engines 46A and 46B. Therefore, upon landing, the valves 60A and 60B are opened.

Figure 6:
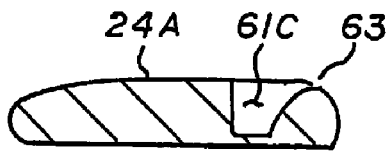
FIG. 6 is a cross-sectional view the canard taken along the line 5-5 in FIG. 1 illustrating the airflow about the canard when the canard is blown.
Figure 7:
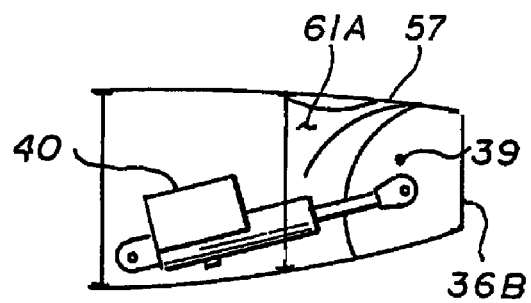
FIG. 7 is a cross-sectional view of one of the flaps at the trailing edge of the wing.

Duct 56A connects to the distribution channel 61A, which distributes air over the left outboard flap 36A and part of inboard flap 32A via slot 57 (see FIG. 6). Duct 56B connects to distribution channel 61B, which distributes air over the left inboard flap 32A. Duct 56C distributes air to distribution channel 61C via a flow control valve 62 and pivoting connection 64 to left canard 24A (see FIG. 5) The valve 62 is used to control the airflow over left canard 24A, which exits slot 63 in the distribution channel 61C to very the lift produced thereby (see FIG. 6).

The distribution system 50B includes lines 72A and 72B coupled to the fan sections 51C and 51D of the engines 46C and 46D which include pressure regulator shut off valves 73A and 73B mounted therein. The lines 72A and 72B connect to a distribution duct 74, which provides high pressure air to ducts 76A and 76B and 76C.

As previously stated, at takeoff, the engines are at full power and there is sufficient air at high enough pressure level that only fan air is necessary. However, upon landing, where the engines are at a much reduced power setting, it is necessary to provide additional air from the compressor sections of the engine to maintain pressure levels. Thus coupled to the distribution duct 74 are lines 79A and 79B, having control pressure regulator valves 80A and 80B mounted therein, which are connected to the compressor section 50C and 50D of the engines 46C and 46D. Therefore, upon landing, the valves 80A and 80B are opened.

Duct 76A connects to distribution channel 81A, which distributes air over the trailing edge outboard flap 36B and part of flap 32B. Duct 76B connects to distribution channel 81B, which distributes air over the left inboard flap 32B. Duct 76C distributes air to distribution channel 81C via a flow control valve 82 and pivoting connection 84 to right canard 24B. The valve 82 is used to control the airflow over right canard 24B to very the lift produced thereby.

Thus at takeoff, the right and left canards 24A and 24B are extended. With all engines 46A-46D at full power, compressor bleed air is not required and valves 60A, 60B and 80A, 80B are closed since the engines are at full power. Valves 54A, 54B and 73A and 73B are open. Valves 62 and 82 are open and modulating airflow to the canards 24A and 24B. After takeoff, the left and right canards 24A and 24B are no longer required and are retracted and valves 54A, 54B and 73A, 73B are closed. Upon approach to and landing, the left and right canards 24A and 24B are again extended. Because the power produced by the engines 46A-46D is greatly reduced, the valves, 53A, 53B and 73A and 73B are again opened as well as valves 60A, 60B and 80A, 80B, because both fan and compressor air flow is needed. A crossover duct 86 having flow control valve 87 therein connects duct 56C to duct 76C and is opened should an engine failure occur.

It should be noted that airflow for the flaps and canard can be provided by an auxiliary power unit coupled to an air pump or an electric motor driving an air pump could also be used. However, air extracted from the propulsion system is presently preferred.

Referring back to FIG. 2, the canard actuation system 26 includes two ball screw actuators 90 and 92 each having motors 94 and 96 pivotally attached to aircraft structure 98. Each actuator 90 and 92 have screw shafts 100 and 102, which engage nut members 106 and 108 rotatably mounted on the canards 24A and 24B. Thus rotation of the screw shafts 100 and 102 will cause the canards to extend or retract. For purposes of illustration the canard 24A is shown extended and the canard 24B are always extended and retracted in unison. It should also be noted that other actuation systems may be used.

Figure 8:
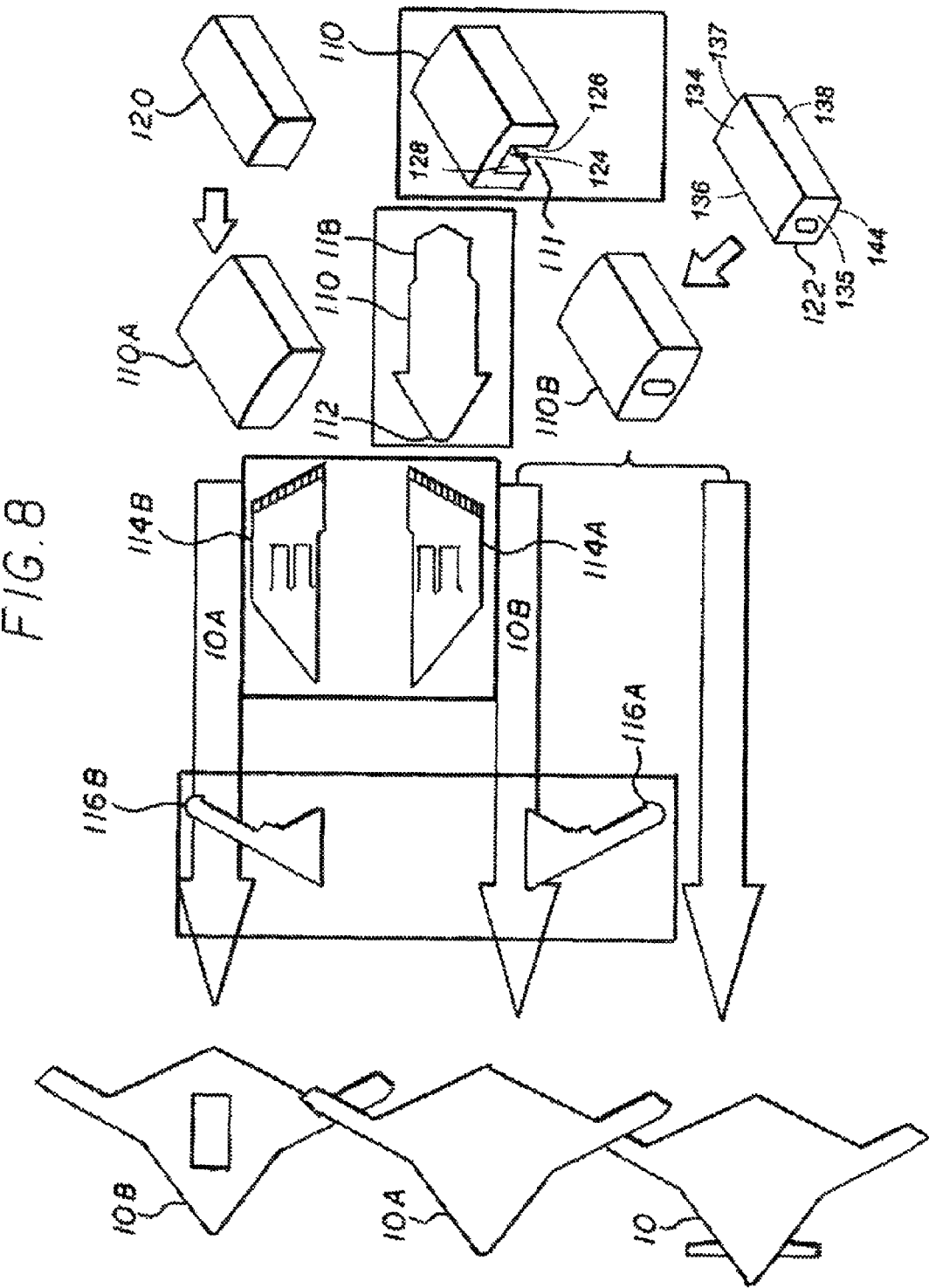
FIG. 8 is an exploded view of the aircraft illustrating the major subassemblies of the aircraft.

FIG. 8 discloses a pictorial representation of the major structural components of the above described cargo version of the aircraft, designated by numeral 10, a tanker version 10A and a weapons carrier (bomber) version 10B. Aircraft 10A and 10B are generally similar to the aircraft 10, except they have no retractable canards 24A and 24B, and the air pressurization system 52 is removed. They are not required for these configurations. However, the external contours of the aircraft 10A and 10B remain otherwise similar to the aircraft 10. All three versions of the aircraft include a common center fuselage section 110, having a recess 111, a nose section 112, propulsion sections 114A and 114B and wing sections 116A and 116B and aft section 118. The recess 111 defines recess top surface 124 and side surfaces 126 and 128. The recess is sized for receiving any one of the plurality of mission specific compartments systems, as described below. In the aircraft 10B (bomber version), a weapons bay 120 in the center fuselage section 110 forming an assembly 110A. In the aircraft 10 (cargo version) and aircraft 10A (fuel tanker) a cargo container section 122 is installed in common fuselage section forming assembly 110B.

Each version of the compartment systems 122 includes a lower surface 144 which, when the compartment system is inserted within the recess 111, of center section 110, defines a portion of the aircraft exterior surface. Each version of the compartment system also defines a top surface 134, side surfaces 136 and 138, front surface 135 and rear surface 137. Upon installation of the compartment system into the recess 111, all surfaces of the compartment system, other than lower surface 144, are disposed within aircraft exterior surface. Top surface 134 and side surfaces 136, 138 are disposed proximate the adjacent surfaces 124, 126, and 128 of recess 111, within the aircraft exterior surface.

Figure 9:
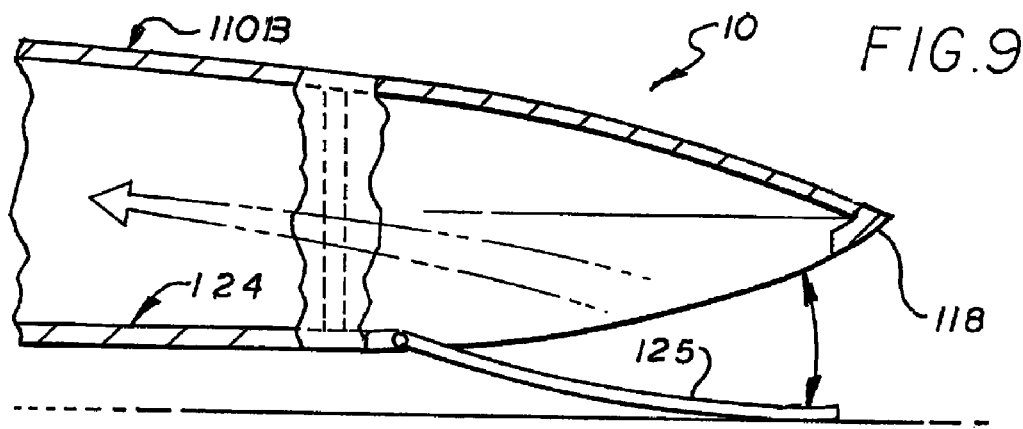
FIG. 9 is a partial side cross-sectional view of the aircraft configured as a cargo aircraft/
Figure 10:
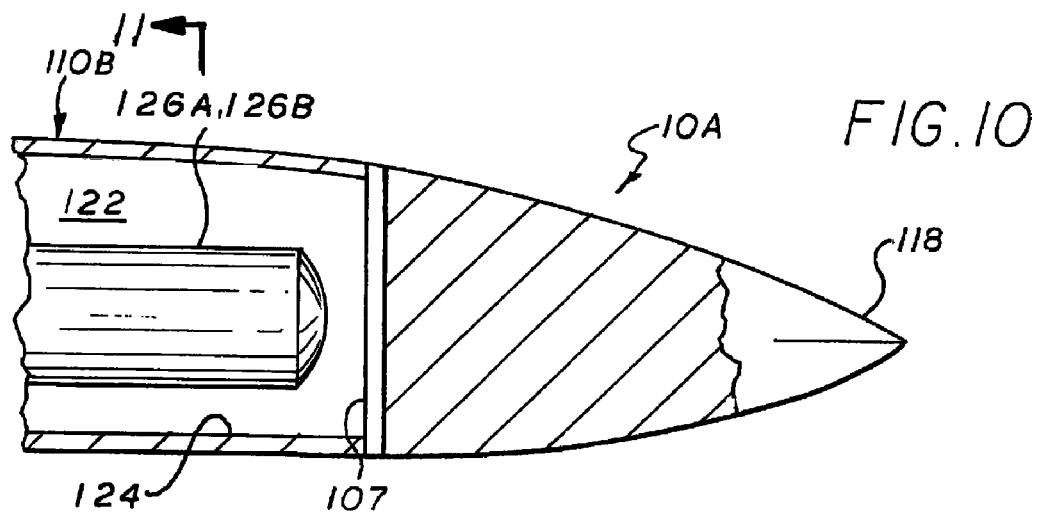
FIG. 10 is a partial side cross-sectional view the aircraft configured as a refueling aircraft.
Figure 11:
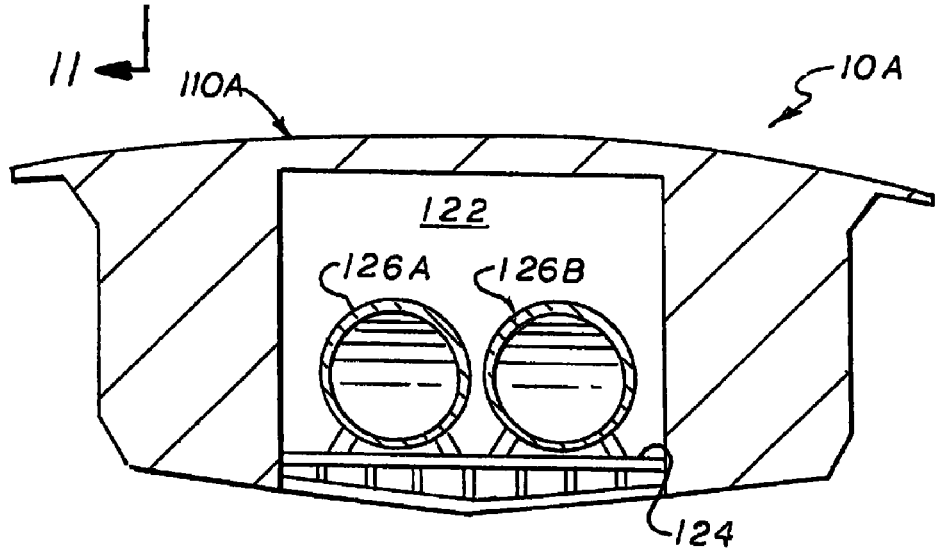
FIG. 11 is a cross-sectional view along the line 11-11 shown in FIG. 10.
Figure 12:
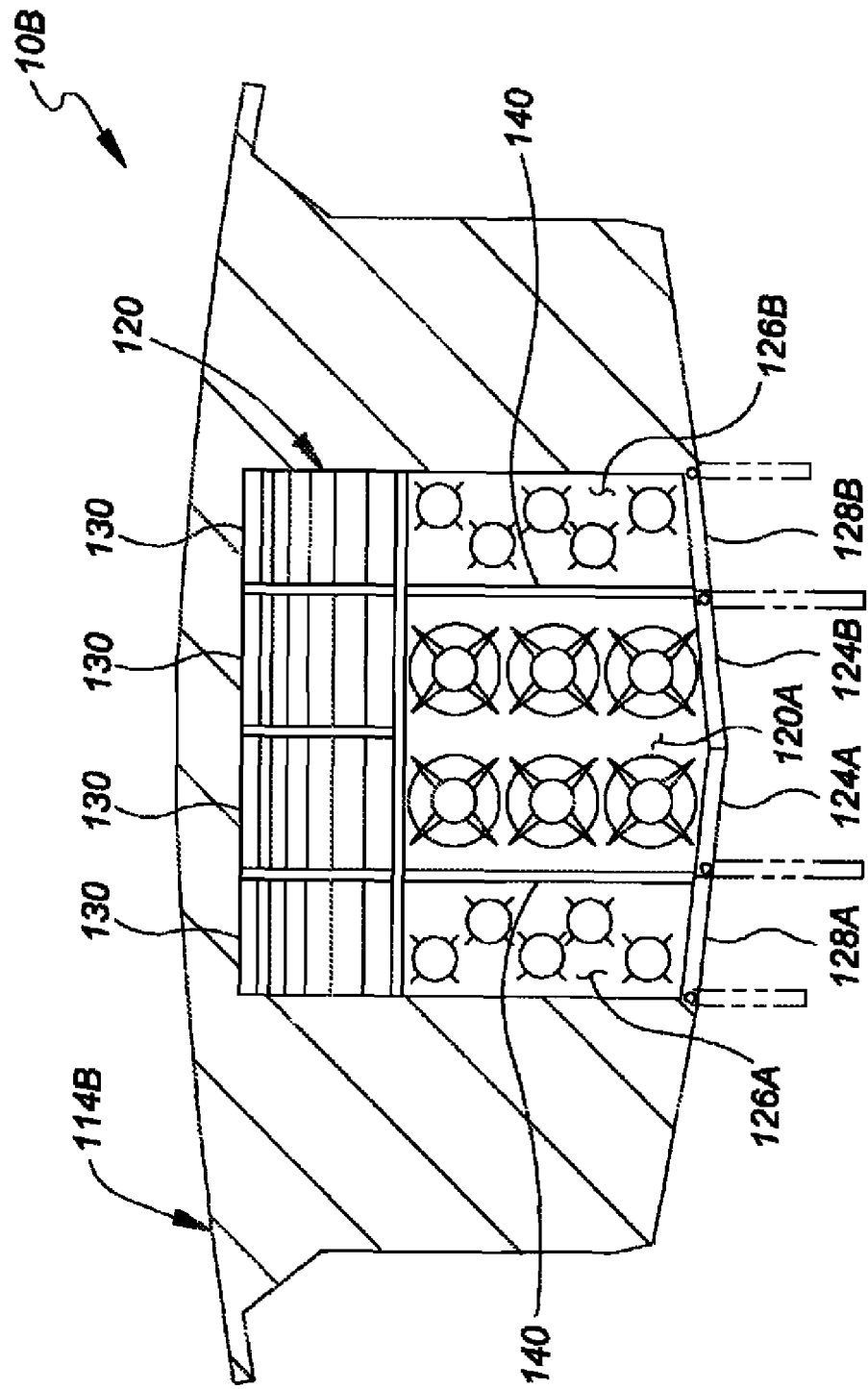
FIG. 12 is a cross sectional view of the aircraft configured as a weapons delivery aircraft.

Referring to FIG. 9, the aircraft 10, cargo container section 122 includes a floor section 124, and the aft section 118 is open and includes a door 125. Referring to FIGS. 10 and 11, in the aircraft 10A, there is no aft door and fuel tanks 126A and 126B are installed. An aft section 118 bulkhead 107 is installed. Referring to FIG. 12 in the aircraft 10B, the weapons bay 120 includes auxiliary fuel tank 130, a main weapons bay 120A having bomb hay doors 124A and 124B and side missile compartments 126A and 126B with doors 128A and 128B. The weapons hay 120, includes bulkheads 140 that partition off the main weapons bay 120A and missile compartments 126A and 126B.

Thus it can be seen that the flying wing aircraft design can accommodate three separate missions within a common external configuration of the aircraft. Between the weapons carrier and fuel system and cargo system aircraft a commonality is projected at 90 percent commonality for the wing sections 116A and 116B. 80 percent commonality between the propulsion system sections 114A and 114B and a 60 percent commonality between center section 110.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft manufacturing industries.

The invention claimed is:

1. A flying wing aircraft having an exterior surface, the aircraft comprising:
   an airframe including a forward fuselage segment and an aft fuselage segment;
   left and right propulsion segments adapted to mate to said fuselage segments;
   left and right wing segments adapted to mate with said left and right propulsion segments respectively; and
   a center section formed to define a recess for receiving one of a plurality of compartment systems, each compartment system being insertable within the recess, the center section further being engagable to the forward fuselage segment and to the aft fuselage segment;
   each compartment system defining a lower surface, side surfaces, a front surface, a rear surface, and a top surface such that, upon insertion within the center section recess, the lower surface defines a portion of the aircraft exterior surface, and the side surfaces and top surface are disposed within the recess.

2. The aircraft as set forth in claim 1 further comprising a compartment system connected to the center section, the compartment system being formed as one of the group consisting of a bomb bay, a cargo compartment system and a tanker compartment system.

3. The flying wing aircraft as set forth in claim 2 wherein when said compartment system is said cargo bay, said aircraft further comprises:
   right and left retractable canards mounted to said forward fuselage section; and
   an air system supply to provide pressurized air from said propulsion system for blowing pressurized air over said canards.

4. The flying wing aircraft as set forth in claim 3 wherein the aircraft includes trailing edge flaps and said air supply system provides air over the flaps.

5. The flying wing aircraft as set forth in claim 2 wherein each oldie compartment systems are interchangeable, while maintaining substantially the same external dimensions of the flying wing aircraft.

6. The flying wing aircraft as set forth at claim 2 wherein when the flying wing aircraft receives the bomb bay or the tanker compartment system, the external configuration of the aircraft remains substantially the same.

7. The flying wing aircraft as set forth in claim 2 wherein each of the compartment systems defines an exterior surface portion formed to substantially conform to the adjacent exterior surface of the aircraft.

8. The flying wing aircraft as set forth in claim 7 wherein said cargo compartment system defines cargo bay doors formed in the aircraft exterior surface portion.

9. The flying wing aircraft as set forth in claim 7 wherein the tanker compartment system includes a plurality of fuel tanks.

10. The flying wing aircraft as set forth in claim 1 wherein the center section recess defines a recess top surface and recess side surfaces, and wherein, upon insertion within the center section recess, the compartment system top surface and side surfaces are disposed adjacent the recess top surface and side surfaces, respectively.

11. The flying wing aircraft as set forth in claim 1 wherein upon insertion within the center section recess, the compartment system top surface, side surfaces, front surface and rear surface are each disposed with the aircraft exterior surface.

* * * * *

UNITED STATES PATENT AND TRADEMARK OFFICE
CERTIFICATE OF CORRECTION

| | | |
|---|---|---|
| PATENT NO. | : 8,292,220 B1 | Page 1 of 1 |
| APPLICATION NO. | : 12/383193 | |
| DATED | : October 23, 2012 | |
| INVENTOR(S) | : Bryan Wayne Westra et al. | |

It is certified that error appears in the above-identified patent and that said Letters Patent is hereby corrected as shown below:

column 1, line 14, "mission" should be -- missions --
column 1, line 42, "payload. In." should be -- payload, in --
column 2, line 4, "section adapted" should be -- section is adapted --
column 3, line 25, "could only have" should be -- could have -- column 6, claim 5, line 29, "oldie" should be -- of the --
column 6, claim 11, line 55, "with" should be -- within --

Signed and Sealed this
Twenty-second Day of January, 2013

David J. Kappos
*Director of the United States Patent and Trademark Office*